United States Patent
Bnayahu et al.

(10) Patent No.: US 9,292,410 B2
(45) Date of Patent: Mar. 22, 2016

(54) USING TRACEABILITY LINKS STRENGTH FOR SOFTWARE DEVELOPMENT INTEGRITY MONITORING

(75) Inventors: Jonathan Bnayahu, Haifa (IL); Moti Nisenson, Haifa (IL); Yahalomit Simionovici, Moshav Kerem Maharal (IL)

(73) Assignee: International Business Machines Corporation, Armonk, NY (US)

( * ) Notice: Subject to any disclaimer, the term of this patent is extended or adjusted under 35 U.S.C. 154(b) by 618 days.

(21) Appl. No.: 13/290,088

(22) Filed: Nov. 6, 2011

(65) Prior Publication Data

US 2013/0117725 A1 May 9, 2013

(51) Int. Cl.
G06F 11/36 (2006.01)
G06F 9/44 (2006.01)

(52) U.S. Cl.
CPC .............. *G06F 11/3604* (2013.01); *G06F 8/30* (2013.01); *G06F 8/71* (2013.01); *G06F 8/75* (2013.01); *G06F 8/77* (2013.01); *G06F 8/10* (2013.01); *G06F 8/20* (2013.01)

(58) Field of Classification Search
None
See application file for complete search history.

(56) References Cited

U.S. PATENT DOCUMENTS

| | | | |
|---|---|---|---|
| 7,174,348 B1 * | 2/2007 | Sadhu et al. | 717/101 |
| 7,640,532 B2 | 12/2009 | Jain et al. | |
| 7,735,068 B2 * | 6/2010 | Siddaramappa et al. | 717/101 |
| 7,908,583 B2 * | 3/2011 | Sengupta et al. | 717/120 |
| 8,312,415 B2 * | 11/2012 | Marius et al. | 717/101 |
| 8,429,610 B2 * | 4/2013 | Clemm et al. | 717/122 |
| 2006/0048093 A1 * | 3/2006 | Jain et al. | 717/104 |
| 2006/0248502 A1 * | 11/2006 | Sueur et al. | 717/101 |
| 2007/0130561 A1 * | 6/2007 | Siddaramappa et al. | 717/106 |
| 2007/0143744 A1 * | 6/2007 | Clemm et al. | 717/128 |
| 2007/0162522 A1 * | 7/2007 | Sengupta et al. | 707/203 |
| 2008/0263504 A1 | 10/2008 | Marius et al. | |
| 2010/0162215 A1 * | 6/2010 | Purcell et al. | 717/127 |
| 2012/0284694 A1 * | 11/2012 | Waugh et al. | 717/122 |
| 2013/0086556 A1 * | 4/2013 | Grechanik | 717/126 |
| 2013/0117725 A1 * | 5/2013 | Bnayahu et al. | 717/101 |

OTHER PUBLICATIONS

De Lucia, A., Fasano, F., Oliveto, R., and Tortora, G. "Recovering traceability links in software artifact management systems using information retrieval methods." Sep. 2007. ACM Trans. Software Engineering and Methodology 16(4), pp. 13:1 through 13:50. Retrived from http://doi.acm.org/10.1145/1276933.1276934.*

Abadi et al., "A Comparison of Traceability Techniques for Specifications", International Conference on Program Comprehension (ICPC), 2008.

* cited by examiner

*Primary Examiner* — Emerson Puente
*Assistant Examiner* — Erika Kretzmer

(57) ABSTRACT

A computerized method that combines identifying conflicting requirements and monitoring requirements integrity. Traceability link strengths are computed between a code element and a plurality of requirements. Revised traceability link strengths are computed between a revised version of the same code element and the plurality of requirements. The revised traceability link strengths are compared to the pre-existing traceability link strengths and a deviation decreased is identified when the revised traceability link strength is less than the pre-existing traceability link strength. An additional traceability link strength is computed between the revised version of the same code element and a new requirement, the new requirement first appearing with the revised version of the same code element. A conflict between the new requirement and the pre-existing requirements is identified when both a deviation decrease is identified and when additional traceability link strength exceeds a correlation threshold.

16 Claims, 8 Drawing Sheets

```
000240    /**
000241     *
000242     * Checkout the project specified by this reference.
000243     *
000244     * @param monitor project monitor
000245     * @return true if loaded, else false
000246     * @throws TeamException
000247     */
000248    boolean checkout (IProgressMonitor monitor) throws TeamException {
000249       if (repositoryLocation == null)
000250          return false;
000251       CVSProjectSetCapability . checkout (
000252          repositoryLocation,
000253          project,
000254          module,
000255          tag,
000256          monitor);
000257       return true;
000258    }
000259 }
```

FIG. 5

Checking out a module from a CVS repository

Modules can be defined in the CVSROOT/modules file of a CVS repository. To check out such a module from a CVS repository to the Workbench:

1. Switch to the CVS Repository Exploring perspective or add the CVS Repositories view to the current perspective.
2. In the CVS Repositories view, expand the repository location.
3. Expand HEAD and select the modules that you want to add to the Workbench. *Note*: Modules appear as root folders of the repository but are associated with the  icon.
4. From the pop-up menu select Check Out. This will checkout the module into one or more projects in the local workspace, depending on how the module is defined in the repository.

*Note*: Defined modules can also be checkout out using the Checkout Wizard.

● Related concepts
Team programming with CVS
CVS Repositories

● Related tasks
Checking out a project from a CVS repository
Checking out a folder into an existing project
Creating a CVS repository location
Replacing resources in the Workbench
Discovering branch and version tags
Sharing a new project using CVS
Synchronizing with the repository
● Related reference
CVS
CVS Repositories view
CVS Checkout wizard

FIG. 6

USING TRACEABILITY LINKS STRENGTH FOR SOFTWARE DEVELOPMENT INTEGRITY MONITORING

BACKGROUND

The present invention, in some embodiments thereof, relates to software development, more specifically, but not exclusively, to monitoring requirement and/or code elements integrity.

For large software development projects, it is easy to lose track of requirements and their implementation in the code. After a requirement is implemented, the code continues to evolve and the logic supporting that requirement may be changed or removed. In such software development projects, traceability links may be used for linking between requirements, such as product documentation requirements, and source code or a high level representation of the source code. Having traceability links between source code and requirements facilitate performing a variety of software maintenance tasks including impact analysis, program comprehension, and requirements assurance of high quality systems. For an observer or a text analysis module, these links help explain why a particular function or class exists in the program.

Various systems and methods have been developed in the last years. For example, U.S. Pat. No. 7,640,532 describes a connection which is established between the source code and the business requirements of a software system. User specified keyword that reflects business requirements are expanded using ontology and a thesaurus. The augmented list of user specified keywords are matched to the automatically annotated source code. The results of the match along with call graph of the source code are used to generate workflows that provide a mapping from the source code to business logic.

U.S. Patent Application No. 2008/0263504 describes various technologies and techniques that allow project requirements to be associated with underlying code elements. A particular software project is analyzed to generate a list of code elements contained in the particular software project. Input is received from a user of a requirements management application to associate one or more project requirements to one or more of the code elements. The project requirements and an association with the one or more code elements are stored in a data store for later retrieval. These associations are used to determine when changes that potentially affect the project requirement are made to the underlying code elements. A software development application is operable to interact with the data store and provide a notice to a user of the software development application that a change to a particular code element of the software project will impact one or more project requirements.

SUMMARY

According to some embodiments of the present invention, there is provided a computerized method for monitoring integrity of an application development project having a plurality of code elements and a plurality of requirements. The method comprises computing a first strength for each of a plurality of traceability links each between a certain code element of the plurality of code elements in a current software code version of the application development project and one of the plurality of requirements, computing a second strength for each of the plurality of traceability links in a new software code which includes a revision to the certain code element from the current software version, and generating an inconsistency notification based on a deviation between respective the second strength and the first strength.

Optionally, the method further comprises analyzing the application development project and the plurality of requirements to automatically identify the plurality of traceability links.

Optionally, the method further comprises receiving a manual input indicative of the plurality of traceability links from a user.

Optionally, the method further comprises providing an inconsistency notification threshold; wherein the generating comprises generating the inconsistency notification if the deviation is greater than the inconsistency notification threshold.

Optionally, the method further comprises providing a correlation threshold; wherein the new software code version comprises a new requirement; wherein the generating comprises computing a third strength of an additional traceability link between the certain code element and the new requirement and the generating is performed if the third strength exceeds the correlation threshold.

More optionally, the inconsistency notification is indicative of a conflict between the new requirement and at least one of the plurality of requirements.

Optionally, the computing is performed according to semantic analysis of the certain code element.

Optionally, the computing is performed according to semantic analysis of the plurality of requirements.

Optionally, both the current software code version and the new software code are stored in a common database and selected by at least one of a user and an automatic analysis of records in the database.

Optionally, the computing a first strength, the computing a second strength and the generating is performed for each of a plurality of code elements in a current and new software code versions of the application development project.

According to some embodiments of the present invention, there is provided a system for monitoring of an application development project having a plurality of code elements and a plurality of requirements. The system comprises a processor, a traceability link strength module which uses the processor to compute a first strength for each of a plurality of traceability links each between a certain code element of the plurality of code elements in a current software code version of the application development project and one of the plurality of requirements and a second strength for each of the plurality of traceability links in a new software code which includes a revision to the certain code element from the current software version, and an alarming module which generates an inconsistency notification based on a deviation between the second strength and the first strength.

Optionally, the system further comprises an interface which access the plurality of requirements and the plurality of code elements to identify the plurality of traceability links.

More optionally, the interface receives the plurality of requirements from a software development workspace.

Optionally, the system further comprises a traceability link identification module which analyses the plurality of requirements and the plurality of code elements to identify the plurality of traceability links automatically.

According to some embodiments of the present invention, there is provided a computerized method for identifying a requirement conflict in an application development project having a plurality of code elements and a plurality of requirements. The method comprises providing a correlation threshold, providing a plurality of traceability links each between a certain code element in a current software code version of the application development project and one of the plurality of requirements, identifying a new traceability link between the certain code element in a new software code version of the application development project and at least one new requirement, computing a strength for the new traceability link; and generating a notification indicative of a requirement conflict if the strength exceeds the correlation threshold.

Optionally, the correlation threshold is manually set by a user.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIGS. 4-6 depict screenshots of a tool that presents code elements from an exemplary application development project;

DETAILED DESCRIPTION

Figure 1:
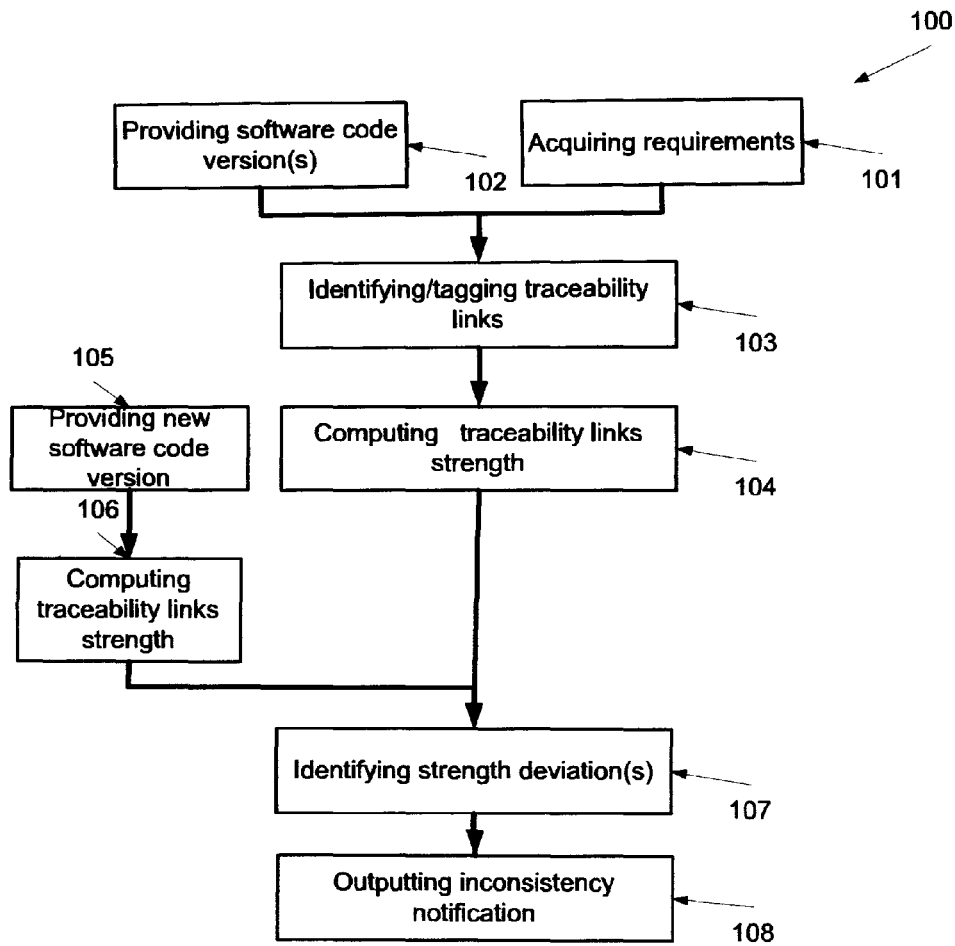
FIG. 1 is a flowchart of a method for monitoring requirements integrity, according to some embodiments of the present invention.

The present invention, in some embodiments thereof, relates to software development, more specifically, but not exclusively, to monitoring requirement and/or code elements integrity.

According to some embodiments of the present invention, there are provided methods and systems of monitoring the integrity of an application development project having a plurality of requirements by detecting changes in the strength of one or more traceability links between software code versions of the application development project.

For example, the method is based on computing the strength of each one of a plurality of traceability links between code elements in each of a number of software code versions of the application development project and detecting a change in the strength of one or more traceability links between software code versions. Based on this change, also referred to as a deviation, one or more inconsistency notifications may be generated and outputted, for example presented as messages to a user of a software development workspace. The method which is outlined above and described below allows identifying inconsistency between code elements and requirements in the development of a project and automatically alerting a user, optionally in real time, based on analysis of traceability links.

According to some embodiments of the present invention, there are provided methods and systems of detecting requirement conflicts in an application development projects when strength(s) of one or more new traceability links in a new software code version of the application development project exceeds a correlation threshold, which is optionally a dynamic correlation threshold.

For example, the method is based on computing the strength of a new traceability link between an existing code element and a new requirement and determining whether it exceeds the correlation threshold. Based on this detection, one or more inconsistency notifications may be generated and outputted, for example presented as messages to a user of a software development workspace.

Optionally, the requirement conflicts are detected when a new traceability link, which is connected to a certain code element in a new software code version, exceeds a correlation threshold and when the strength of another traceability link, which is connected to the same certain code element in the new software code version, changes in relation to a previous software code version of the application development project.

The method which is outlined above and described below allows determining requirement conflicts in a source code version of the development project and alerting a user with regard to requirement conflicts, optionally in real time, based on analysis of traceability links.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Reference is now made to FIG. 1, which is a flowchart of a method 100 for monitoring the integrity of development requirements, referred to herein as requirements, according to some embodiments of the present invention. The monitoring is performed by detecting deviations between the strength of traceability link(s) in a certain software code version of an application development project and the strength of these traceability links in a newer software code version of the application development project. As used herein, an application development project means a development project pertaining to a software product and/or a hardware product and/or a service and/or any part of the product and/or service.

Figure 2:
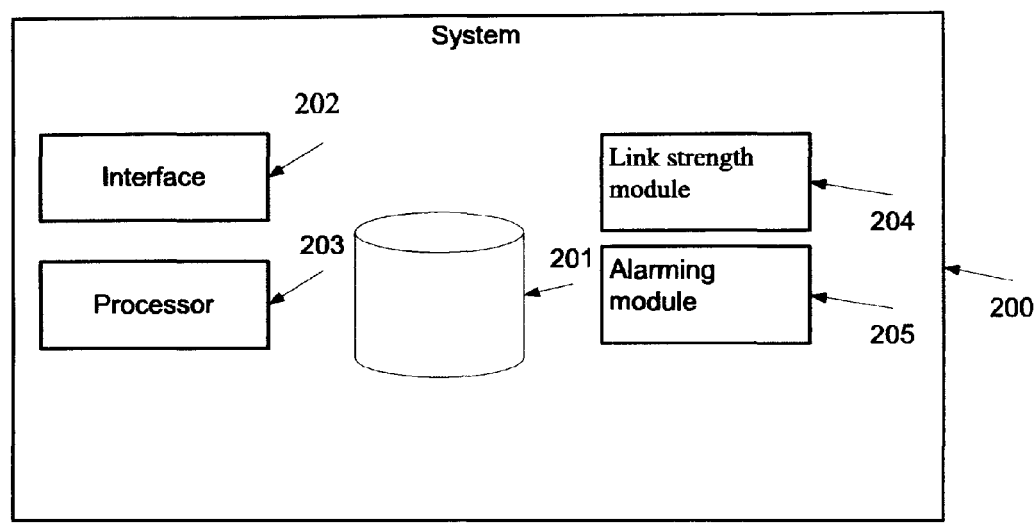
FIG. 2 is a relational view of software and hardware components of a system for monitoring requirements integrity, according to some embodiments of the present invention.

Reference is also made to FIG. 2, which is a relational view of software and hardware components of a system 200 for monitoring requirements integrity and/or requirement conflict(s), according to some embodiments of the present invention. The system 200 includes a database 201 which stores one or more software code versions of an application development project and/or the revisions between software code versions of an application development project. The database 201 optionally manages a dataset of software code versions and/or a dataset of revisions between software code versions. For example, one or more metrics documenting identified revisions may be used. The database 201 may be used for storing software code version(s) of a number of different application development projects. The system 200 further includes an interface 202, a processor 203, a link strength module 204, and an alarming unit 205. For brevity, it should be noted that computing functions described hereinbelow may be performed using the processor 203.

First, as shown at 101, the interface 202 acquires, for example receives or accesses, a plurality of requirements for a certain application development project having a plurality of code elements. The requirements are optionally requirements extracted from and/or elaborated in a product requirements document (PRD) that defines a product or a service or additions to product or a service.

The plurality of requirements may be received as a file, scanned from a document, indicated by a link to a file, extracted from a code source by an analysis, such as a textual analysis, marked or selected in a workspace and/or the like.

Optionally, as shown at 102, software code versions of the certain application development are provided, for example from the database 201.

Optionally, as shown at 103, the system 200, for example the link strength module 204, identifies and tags a plurality of traceability links between each code element and each one of the requirements of the application development project in one or more of the software code versions in the database 201, for example at least at the most up-to-date software code version of the application development project. The plurality of traceability links of the application development project may be identified and tagged manually by an operator and/or automatically by an analysis of the software code by a traceability link retrieval and/or discovery technique, module and/or tool, for example as known in the art.

Now, as shown at 104, the system 200, for example the traceability link strength module 204, computes a traceability link strength for each of one of the traceability links in the current software code version, for example in the most up-to-date software code version. Optionally, the current software code version automatically identified by the system 200 and/or selected by a user of a workspace and/or the like.

Figure 3:
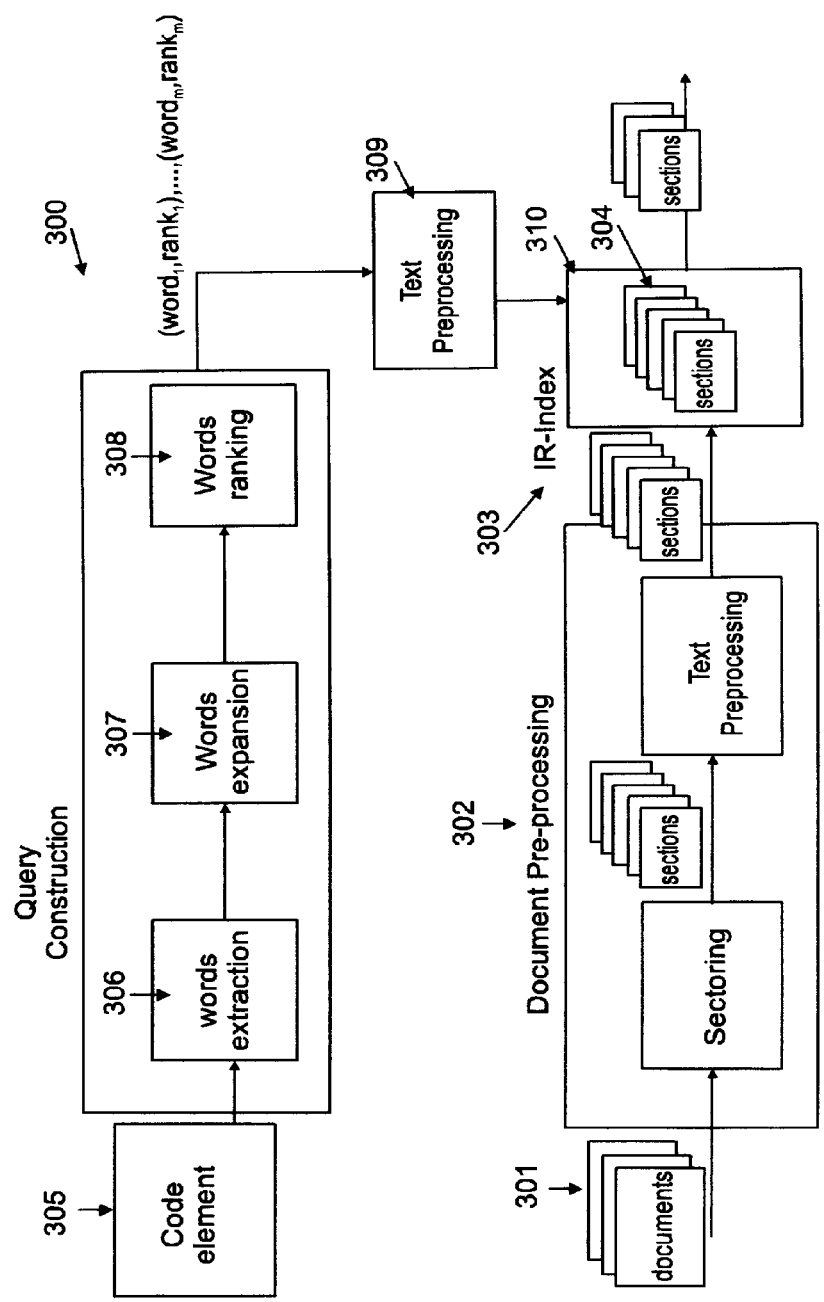
FIG. 3 is a flowchart of a process for measuring the strength of traceability links which connect between code elements and requirements in an application development project, according to some embodiments of the present invention.

For example, reference is now made to FIG. 3, which is a flowchart 300 of a process for measuring the strength of traceability links which connect between code elements and requirements in an application development project, such as the aforementioned traceability links, according to some embodiments of the present invention. In this process, requirements and traceability links are identified automatically. As shown at 301, one or more requirement documents are segmented into sections, where each section contains a single requirement.

Then, as shown at 302, each section is preprocessed using any of various techniques, such as filter stop words algorithms and stemming. Then, as shown at 303, the sections are indexed and forwarded to a search engine, as shown at 304. In addition, as shown at 305, each code element of a software code version of the certain application development is converted to a query to identify one or more requirements which it should follow. Optionally, as shown at 306, 307, and 308 words from the code element are extracted, expanded, and ranked. For example, for a Java class, words are extracted from one or more of the following fields: a class name, public function names, class comments, public function arguments and return types, super class names and implemented interfaces, and public function comments. The words may be than ranked according to the semantic meaning of its source. For example, a class name is ranked higher than a comment. Optionally, as shown at 309, the extracted and ranked words are preprocessed, for example using any of various techniques, such as filter stop words algorithms and stemming. During the preprocessing or before words concatenated by CamelCase (i.e. medial capitals) or underlines are optionally separated.

Now, as shown at 310, the query is inputted into the search engine that retrieves the related requirements which have been extracted from the requirement document(s). In such an embodiment, a traceability link may be marked between the respective code element and each retrieved requirement and scored with a traceability link based on the ranking of the query words.

The process described in 305-309 is repeated for each code element.

Figure 4:
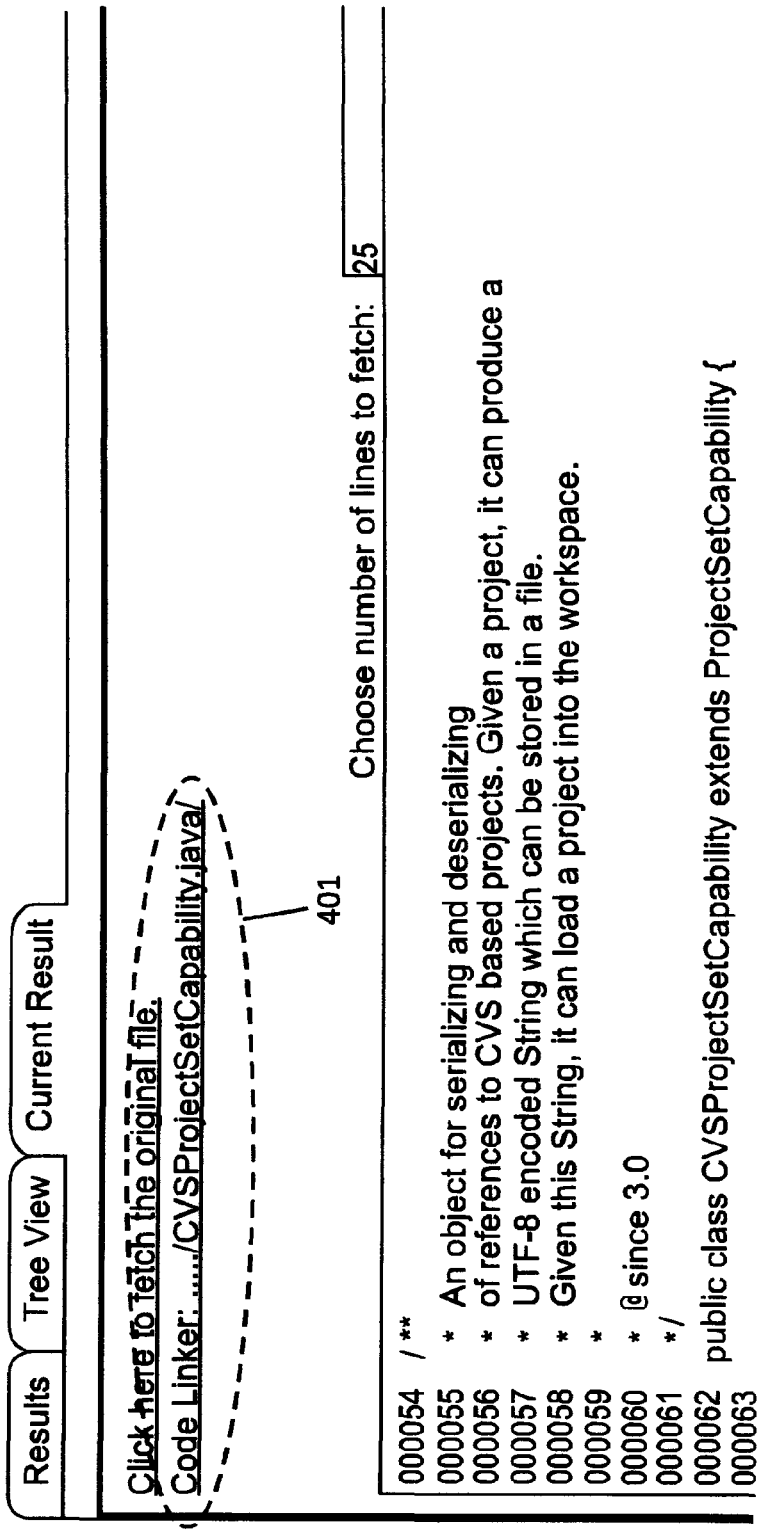

Reference is now made to an exemplary implementation of the process depicted in FIG. 3 in a context aware traceability technology (CATT) tool. FIG. 4 depicts a screenshot of a CATT tool that presents a certain code element, the class CVSProjectSetCapability, from the Eclipse project. FIG. 5 zooms into the class and shows a specific function that deals with checkout of a project from the concurrent versions system (CVS). On the top left corner of FIG. 4 there is a link marked with a circle 401 to retrieve documents related to the code element. FIG. 6 depicts a result retrieved for the class CVSProjectSetCapability from the aforementioned process. It is quite clear that it is a relevant result since it deals with checkout of a project from CVS—exactly as the function zoomed into in the given class.

As shown at 105, a new software code version is received, for example selected by a user of a workspace and/or a user of from the database 201, identified as a software code version which is sent to compilation and/or uploaded to a workspace and/or the like. In the new software code version, one or more code elements have been revised in relation to the must up to date software code version, also referred to herein as the current software code version, for example during the implementation process of the application development project.

Now, as shown at 106, the strength of traceability links of at least the revised code element in the new software code version is calculated. For example, the strength is calculated as described above with regard to block 104.

As shown at 107, a strength deviation between the strength of a certain traceability link in the current software code version and in the new software code version is identified. This process may be repeated for a plurality of traceability links that link revised code elements.

Now, as shown at 108, based on the identified strength deviation(s), an inconsistency notification is generated. The inconsistency notification may be a notice, a comment, and/or a message that is presented in a development workspace and/or added as a remark to the source code and/or a message that is sent to a representative of the application development project. The inconsistency notification optionally includes a description of the inconsistency, for example textual content which is indicative of the requirement and/or the respective code element. Optionally, an inconsistency notification is generated only if the deviation exceeds a certain threshold and/or threshold range.

Figure 7:
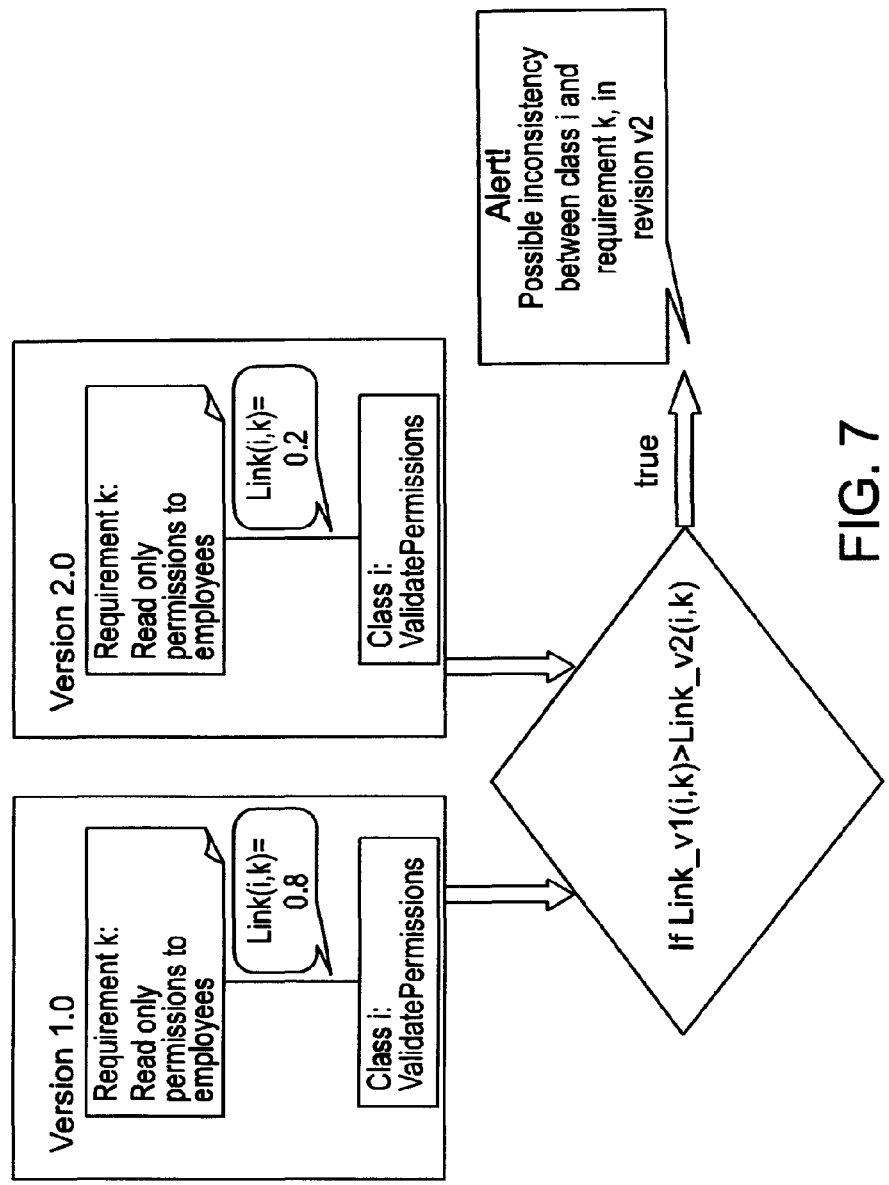
FIG. 7 is a schematic illustration of matching between the strength of a traceability link in a current software code version of an exemplary application development project and the strength of the same traceability link in a new software code version the exemplary application development project, according to some embodiments of the present invention.

For example, reference is now made to FIG. 7, which is a schematic illustration of matching between the strength of a traceability link between a requirement k and a code element class i in a current software code version 1.0, denoted as v1, and the strength of the same traceability link in a new software code version 2.0, denoted as v2. In this matching, an inconsistency notification is generated if for one of the traceability links of the new software code version:

$$t(v2)>t(v1); \text{ and}$$
$$\text{link\_v1}(i,k)>\text{link\_v2}(i,k)$$

where link_denotes a strength measurement function for a certain traceability link, such as the aforementioned strength measurement process, and t(x) denotes a time function that makes sure the new software code version v2 is more up-to-date than the current version v1.

Optionally, the new software code version is stored in the database 201 and marked as the current software code version for future iterations for monitoring requirements integrity in light of newer software code version of the application development project.

Figure 8:
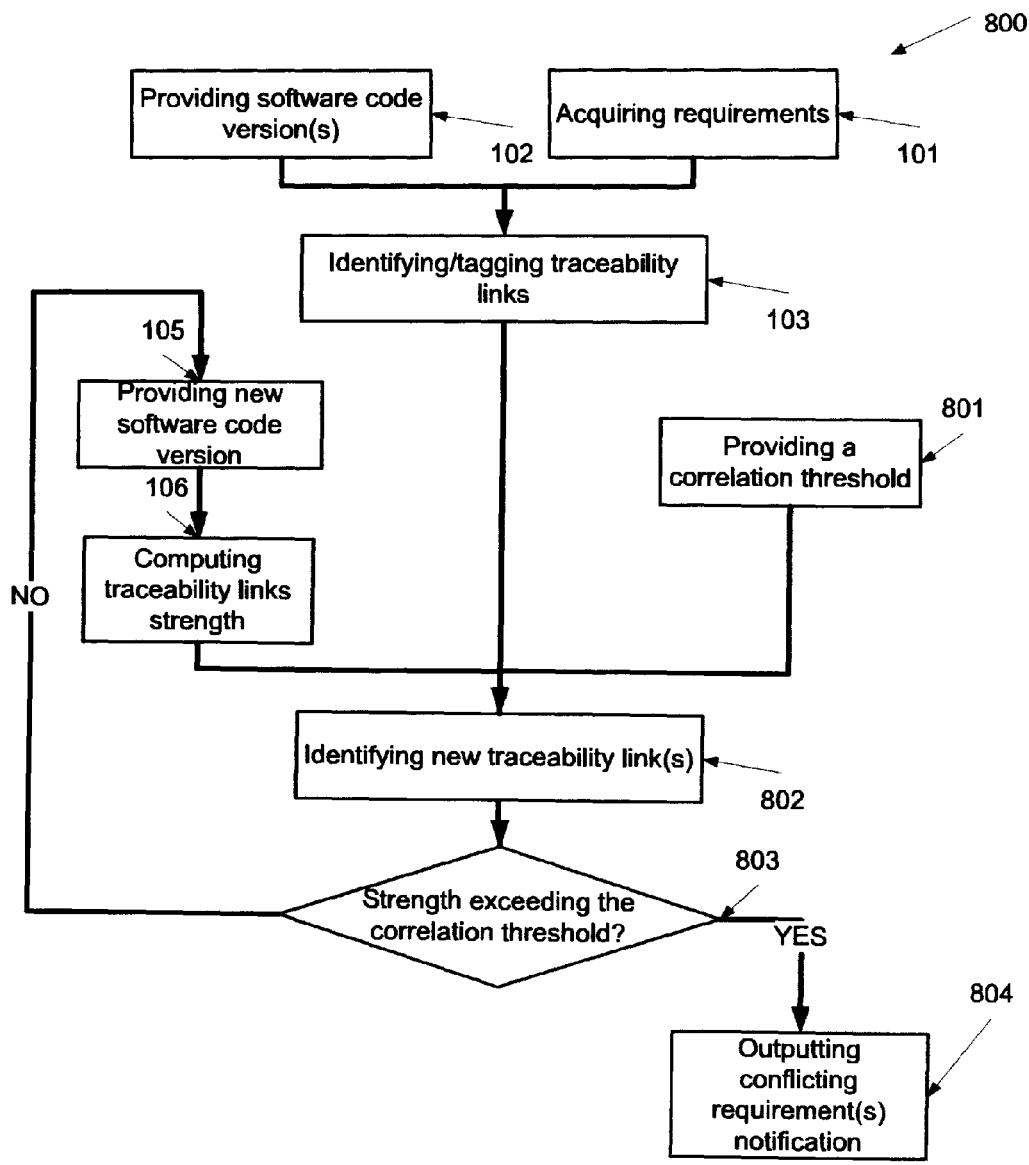
FIG. 8 is a flowchart of identifying conflicting requirements between software code versions of an application development project based on the strength of traceability link(s), according to some embodiments of the present invention.

Reference is now also made to FIG. 8, which is a flowchart 800 of identifying conflicting requirements in a software code versions of an application development project based on the strength of traceability link(s), according to some embodiments of the present invention. Blocks 101-103 and 105-106 are optionally as described above. However, in FIG. 8 further includes blocks 801-804. As shown at 801, a correlation threshold is received, in addition to the new and current software code versions of the application development project in blocks 101-103 and 105-106. Then, as shown at 802, the new software code version is analyzed to identify one or more new traceability links which are not described in the current software code version, for example due to a new requirement. As shown at 803, the strength of one or more of the new traceability link(s) is matched with the correlation threshold. If any of the strengths is higher than the correlation threshold a conflicting requirement notification, such as the aforementioned inconsistently notification, is generated and outputted, as shown at 804. Else, the process ends and/or repeated with new traceability link(s) of a further new software code version(s).

Figure 9:
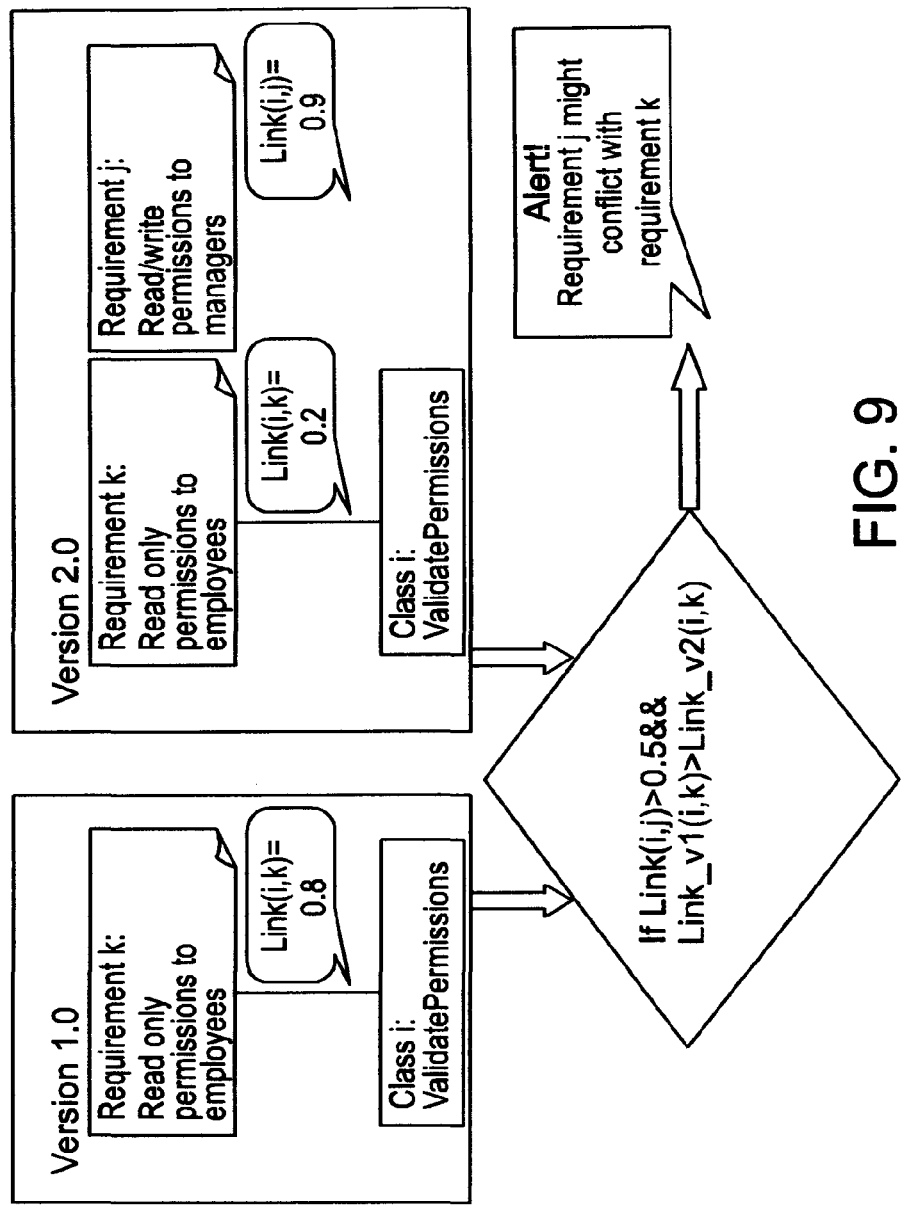
FIG. 9 is a schematic illustration of a process that combines between identifying conflicting requirements and monitoring requirements integrity, according to some embodiments of the present invention.

Optionally, the aforementioned process for identifying conflicting requirements is combined with the aforementioned process for monitoring requirements integrity by identifying traceability link strength deviations. For example, reference is now made to FIG. 9 which is a schematic illustration of such a combined process. As exemplified in FIG. 9, the strength of a traceability link between a requirement k and a code element class i in a current software code version 1.0, denoted as v1, is matched with and the strength of same traceability link in a new software code version 2.0, denoted as v2. This matching is similar to described above with regard to FIG. 7. The process further includes verifying whether the strength of a new traceability link that connects between a new requirement j and the code element class i exceeds an exemplary correlation threshold of 0.5 out of 1. Optionally, if the combined process identifies that both the requirements integrity is impaired by identifying traceability link strength deviations and a requirement conflict is detected according to an exception from the correlation threshold than an inconsistently notification is outputted, as depicted in FIG. 9. The inconsistently notification may be outputted if only the requirements integrity is impaired or is only a requirement conflict is detected.

The methods as described above are used in the fabrication of integrated circuit chips. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems and methods will be developed and the scope of the term a processor, a workspace, and database is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A computerized method for monitoring integrity of an application development project having a plurality of code elements and a plurality of requirements by identifying inconsistency between said code elements and said requirements in development of said project based on monitoring changes to a strength of each of a plurality of traceability links between different software code versions, comprising:
    computing a first strength for each of a plurality of traceability links each between a certain code element of the plurality of code elements in a current software code version of said application development project and one of the plurality of requirements;
    computing a second strength for each of said plurality of traceability links in a new software code which includes a revision to said certain code element from said current software version;
    identifying a deviation based on a decrease in said second strength of a first traceability link of said new software code from said first strength of said first traceability link of said current software version;
    providing a correlation threshold;
    wherein said new software code version comprises a new requirement first appearing in said new software code version;
    computing a third strength of an additional second traceability link between said certain code element and said new requirement, wherein said first and second traceability links connected to the same certain code element and to different requirements;
    identifying a conflict between said new requirement and at least one of said plurality of requirements, based on said third strength exceeding said correlation threshold and based on said deviation decrease from said first strength to said second strength; and
    generating an inconsistency notification based on said identifying said conflict.

2. The method of claim 1, further comprising analyzing said application development project and the plurality of requirements to automatically identify said plurality of traceability links.

3. The method of claim 1, further comprising receiving a manual input indicative of said plurality of traceability links from a user.

4. The method of claim 1, further comprising receiving an inconsistency notification threshold; wherein said generating comprises generating said inconsistency notification based on said deviation being greater than said inconsistency notification threshold.

5. The method of claim 1, wherein said computing further comprises performing semantic analysis of said certain code element.

6. The method of claim 1, wherein said computing further comprises performing semantic analysis of the plurality of requirements.

7. The method of claim 1, wherein both said current software code version and said new software code are stored in a common database and are tagged by at least one of a user and an automatic analysis of records in said database.

8. The method of claim 1, wherein said computing a first strength, said computing a second strength and said generating is performed for at least one of said code elements in a current software code version and for at least one of said code elements in said new software code versions of said application development project.

9. The method of claim 1, wherein said correlation threshold is manually set by a user.

10. The method of claim 1, wherein said comparing further comprising calculating a magnitude of said deviation based on a difference between said second strength and said first strength, and wherein said generating comprises generating said inconsistency notification based on said magnitude being greater than an inconsistency notification threshold.

11. A computer program product to implement a method for monitoring integrity of an application development project having a plurality of code elements and a plurality of requirements, comprising:
    one or more non-transitory computer-readable storage mediums, and program instructions stored on at least one of the one or more storage mediums, the program instructions comprising:
    program instructions for computing a first strength for each of a plurality of traceability links each between a certain code element of the plurality of code elements in a current software code version of said application development project and one of the plurality of requirements;
    program instructions for computing a second strength for each of said plurality of traceability links in a new software code which includes a revision to said certain code element from said current software version;
    program instructions for identifying a deviation based on a decrease in said second strength of a first traceability link of said new software code from said first strength of said first traceability link of said current software version;
    program instructions for providing a correlation threshold;
    wherein said new software code version comprises a new requirement first appearing in said new software code version;
    program instructions for computing a third strength of an additional second traceability link between said certain code element and said new requirement, wherein said first and second traceability links connected to the same certain code element and to different requirements;
    program instructions for identifying a conflict between said new requirement and at least one of said plurality of requirements, based on said third strength exceeding said correlation threshold and based on said deviation decrease from said first strength to said second strength; and
    program instructions for generating an inconsistency notification based on said identifying said conflict.

12. A system comprising computer hardware for monitoring of an application development project having a plurality of code elements and a plurality of requirements, comprising:
    a hardware processor; and
    a non-transitory memory in electrical communication with said hardware processor, said memory having stored thereon:
    a traceability link strength module which uses said processor to compute a first strength for each of a plurality of traceability links each between a certain code element of the plurality of code elements in a current software code version of said application development project and one of the plurality of requirements and a second strength for each of said plurality of traceability links in a new software code which includes a revision to said certain code element from said current software version, and identifies a deviation based on a decrease in said second strength of a first traceability link of said new software code from said first strength of said first traceability link of said current software version, computes a third strength of an additional second traceability link between said certain code element and a new requirement, wherein said new software code version comprises said new requirement first appearing in said new software code version, wherein said first and second traceability links connected to the same certain code element and to different requirements, identifies a conflict between said new requirement and at least one of said plurality of requirements, based on said third strength exceeding a correlation threshold and based on said deviation decrease from said first strength to said second strength; and an alarming module which generates an inconsistency notification based on said identifying said conflict.

13. The system of claim 12, further comprising an interface which access said plurality of requirements and said plurality of code elements to identify said plurality of traceability links.

14. The system of claim 13, wherein said interface receives said plurality of requirements from a software development workspace.

15. The system of claim 12, further comprising a traceability link identification module which analyses said plurality of requirements and said plurality of code elements to identify said plurality of traceability links automatically.

16. A non-transitory computer readable medium comprising computer executable instructions adapted to perform the method of claim 1.

* * * * *